United States Patent [19]

Castro et al.

[11] Patent Number: 5,049,167
[45] Date of Patent: Sep. 17, 1991

[54] MULTILAYER INTERFACIAL COMPOSITE MEMBRANE

[75] Inventors: Robert P. Castro, Sunnyvale; Richard W. Baker, Palo Alto; Johannes G. Wijmans, Menlo Park, all of Calif.

[73] Assignee: Membrane Technology & Research, Inc., Menlo Park, Calif.

[21] Appl. No.: 450,278

[22] Filed: Dec. 13, 1989

[51] Int. Cl.$^5$ .............................................. B01D 53/22
[52] U.S. Cl. .......................................... 55/16; 55/68; 55/158
[58] Field of Search ............................ 55/16, 68, 158

[56] References Cited

U.S. PATENT DOCUMENTS

| | | | |
|---|---|---|---|
| 3,744,642 | 7/1973 | Scala et al. | 210/500 |
| 3,980,456 | 9/1976 | Browall | 55/158 |
| 3,996,318 | 12/1976 | van Heuven | 264/5 |
| 4,132,824 | 1/1979 | Kimara et al. | 423/220 |
| 4,214,020 | 7/1980 | Ward et al. | 55/158 X |
| 4,230,463 | 10/1980 | Henis et al. | 55/68 X |
| 4,243,701 | 1/1981 | Riley et al. | 427/244 |
| 4,277,344 | 7/1981 | Cadotte | 210/654 |
| 4,444,662 | 4/1984 | Conover | 55/158 X |
| 4,470,831 | 9/1984 | Hirose | 55/158 |
| 4,484,935 | 11/1984 | Zampini | 55/158 |
| 4,493,714 | 1/1985 | Ueda et al. | 55/16 |
| 4,528,004 | 7/1985 | Makino et al. | 55/158 |
| 4,553,983 | 11/1985 | Baker | 55/16 |
| 4,559,139 | 12/1985 | Uemura et al. | 210/490 |
| 4,581,043 | 4/1986 | van der Scheer | 55/16 |
| 4,594,079 | 6/1986 | Yamamoto et al. | 55/158 |
| 4,602,922 | 7/1986 | Cabasso et al. | 55/158 |
| 4,631,075 | 12/1986 | Yamabe et al. | 55/158 |
| 4,666,668 | 5/1987 | Lidorenko et al. | 55/158 X |
| 4,713,292 | 12/1987 | Takemura et al. | 55/158 X |
| 4,772,394 | 9/1988 | Swedo et al. | 55/158 X |
| 4,781,733 | 11/1988 | Babcock et al. | 55/16 |
| 4,857,078 | 8/1989 | Watler | 55/158 X |
| 4,857,080 | 8/1989 | Baker et al. | 55/158 X |
| 4,871,378 | 10/1989 | Pinnau | 55/16 |

FOREIGN PATENT DOCUMENTS

| | | | |
|---|---|---|---|
| 0174918 | 3/1986 | European Pat. Off. | 55/158 |
| 59-049803 | 3/1984 | Japan | 55/158 |
| 59-049805 | 3/1984 | Japan | 55/158 |
| 61-291018 | 12/1986 | Japan | 55/158 |
| 62-106810 | 5/1987 | Japan | 55/158 |
| 63-296823 | 12/1988 | Japan | 55/158 |
| 63-305918 | 12/1988 | Japan | 55/158 |

OTHER PUBLICATIONS

H. Strathmann et al., "The Formation Mechanism of Asymmetric Membranes", *Desalination*, vol. 16, (1975).
P. W. Morgan, "Condensation Polymers: by Interfacial and Solution Methods", vol. 10 of Polymer Reviews, Interscience Publishers, New York (1965).
S. Loeb and S. Sourirajan, "Sea Water Demineralization by Means of an Osmotic Membrane", *ACS Advances in Chemistry Series 38*, (1963).

*Primary Examiner*—Robert Spitzer
*Attorney, Agent, or Firm*—J. Farrant

[57] ABSTRACT

A composite membrane particularly useful for gas separation or pervaporation. The membrane has three layers: a microporous substrate, an intermediate sealing layer, and a top permselective layer. The permselective layer is made by interfacial polymerization directly on the sealing layer. The sealing layer prevents penetration of the interfacial polymerization reagents into the substrate pores during membrane preparation and provides a gutter layer in the finished membrane.

31 Claims, No Drawings

MULTILAYER INTERFACIAL COMPOSITE MEMBRANE

This invention was made with U.S. Government support under Contract Number ISI-8760327 awarded by the National Science Foundation. The Government has certain rights in this invention.

FIELD OF THE INVENTION

The present invention relates to a composite membrane for use in gas or vapor separations, pervaporation or other membrane separations. More particularly, the invention relates to a membrane in which the permselective layer is formed by interfacial polymerization. The invention also relates to a method of making such a membrane.

BACKGROUND OF THE INVENTION

Separation of gas mixtures by means of membranes is now practiced industrially, for example in such areas as the production of oxygen-enriched air, nitrogen production for blanketing, separation of carbon dioxide from methane, and hydrogen recovery from various gas mixtures.

Most gas separation membranes are made from polymer materials. One of the principal problems facing membrane makers is the inverse relationship between gas flux and selectivity. Polymers that exhibit high gas fluxes are usually relatively unselective, and those that are highly selective are usually relatively impermeable. This difficulty is minimized by choosing a material with adequate selectivity, then using the material to make the thinnest possible membrane. Various approaches to thinness are known. For example, the membrane may take the form of an asymmetric membrane, similar to those originally developed for reverse osmosis by Loeb and Sourirajan. (S. Loeb and S. Sourirajan, "Sea Water Demineralization by Means of an Osmotic Membrane", *ACS Advances in Chemistry Series* 38, 117 (1963)). Such membranes are homogeneous, but have an asymmetric pore structure, grading from a very finely porous or dense skin to an openly microporous substrate. For gas separation applications, it is usually necessary to overcoat the asymmetric membrane on the skin side with a second layer to plug small defects and pores in the skin surface, as described in U.S. Pat. No. 4,230,463 to Henis and Tripodi. It is possible to make membranes with good characteristics in this way, and gas-separation membranes of this type have found successful commercial application. However, asymmetric membrane technology has been developed for only a few polymers.

Another type of gas separation membrane is a composite structure in which a thin film of the permselective membrane material is coated separately onto a high permeability porous support membrane. The strength function is separated from the permselective function in this case. A number of techniques for preparing such composite membranes are known. For example, U.S. Pat. No. 4,234,701, to Riley and Grabowsky, describes a method in which a silicone rubber prepolymer solution is dip-coated onto a microporous support. U.S. Pat. No. 4,871,378 describes ethylcellulose/polymethylpentene composite membranes made by a similar dip-coating process. Alternatively, films as thin as 50 Angstroms may be prepared by spreading and stretching a polymer solution on water. References describing this liquid casting method include U.S. Pat. No. 3,767,737 to Lundstrom and U.S. Pat. No. 4,132,824 to Kimura et al. The finished films may be picked up on, or laminated to, a microporous support by vacuum pick-up or other techniques known in the art.

Plasma polymerization is another technique that may be applied to composite membrane preparation; U.S. Pat. No. 4,581,043 to van der Scheer covers a method of making gas separation membranes in which the ultrathin selective layer is deposited by plasma polymerization.

Yet another method of making composite membranes is to form the permselective layer directly on the support by interfacial polymerization. This method was developed by Cadotte for the preparation of reverse osmosis (RO) membranes. There is now extensive art in that branch of membrane technology describing interfacially polymerized composite membranes. References that discuss reverse osmosis membranes prepared by interfacial polymerization include U.S. Pat. Nos. 4,277,344 to Cadotte, and 4,599,139 to Uemura and Kurihara. To prepare RO membranes by interfacial polymerization, a microporous support membrane is soaked in an aqueous solution containing a reagent, typically a polyamine. The wet film is then contacted with a water-immiscible solvent containing a second reagent, typically containing diacid chloride or diisocyanate groups. A dense, crosslinked polymer layer forms on the surface of the support membrane at the interface of the two solutions. Reverse osmosis membranes prepared in this fashion have been very successful in achieving good water flux and salt rejection performance. The membranes fail, however, if used for gas separation applications. One problem is the presence of minute defects in the permselective layer. These defects have minimal effect on the flux or rejection properties for reverse osmosis applications. When a membrane is used for gas separation, however, even one or two defects in the permselective layer can result in bulk flow of gases through the defects, thereby essentially destroying the membrane selectivity. Another problem that has not been fully understood or appreciated in the art relates to the formation mechanism of the interfacially polymerized layer. The dense, crosslinked, interfacially polymerized area is confined to a very thin layer at or near the surface of the porous support, where the immiscible reagent solutions have been in contact. Beneath this layer, in the pores of the support, there will remain a less crosslinked, hydrogel layer. When the membrane is used for reverse osmosis applications, this layer remains highly water-swollen and offers little resistance to water passage. When the membrane is dried and used in gas separations, however, the gel will become rigid and glassy. We believe that this layer presents a substantial resistance to gas permeation, and is a significant factor in accounting for the very low gas permeabilities observed when interfacial RO membranes are tested in gas separation applications.

Some work has been done on preparing interfacial composite membranes specifically for gas separation applications. For example, U.S. Pat. No. 4,493,714, to Ueda et al. describes composite membranes made by reacting a polyamine with a polyisocyanate to form a thin polyurea layer. The reaction is carried out directly on a microporous support membrane. The membranes are useful for oxygen/nitrogen separations. U.S. Pat. No. 4,781,733, to Babcock et al., describes membranes made by interfacial polymerization from prepolymers having a variety of mutually reactive functional groups.

As with '714, the polymerization reaction can be carried out on a microporous support, and the interfacially polymerized layer impregnates the support pores to some extent. The membranes exhibit high fluxes and selectivities for certain gas separations, including oxygen/nitrogen and carbon dioxide/methane.

Despite many years of research and development effort, a demonstrated market for proven membrane products, and some successes, it remains an ongoing problem in the art to make composite membranes with thin, yet defect-free permselective layers.

SUMMARY OF THE INVENTION

The invention is a new kind of composite membrane and methods for making such a membrane. The membrane has three layers. The first is a microporous substrate that provides mechanical strength and supports the other layers. Onto this substrate layer is coated a thin sealing layer, which seals the pores in the microporous layer and limits penetration of the reagents used to make the top layer. Neither of these layers need contribute significantly to the separation properties. The top layer is the permselective layer, which is primarily responsible for the membrane separation performance. This layer is made by an interfacial polymerization process. In a representative preparation method, the coated support is submerged for a time in a solution containing one reagent, then drained and dipped in another bath containing the second reagent. A polymerization reaction occurs at the interface of the two solutions, to produce an extremely thin layer of a glassy, highly crosslinked polymer. The rigid structure of this polymer makes it particularly useful for gas separation, because it is selective for one gas or vapor over another, primarily on the basis of molecular size. For example, the resulting membrane may be much more permeable to hydrogen than to other gases. The interfacially polymerized layer is thin enough to permit industrially useful gas fluxes. The membrane is also useful for pervaporation, or for other separations where thin-film composite membranes are used. One particular feature that distinguishes the membranes of the present invention from previously known interfacial composite membranes is the sealing layer between the substrate layer and the permselective layer.

The resulting novel multilayer membrane structure, comprising substrate/sealing layer/interfacially polymerized layer, offers a number of advantages over other types of interfacially polymerized membrane structures. First, the sealing layer prevents penetration of the reagents used to form the interfacially polymerized layer into the pores of the support, so that formation of a swollen layer under the polymerized layer is avoided. Secondly, the sealing layer is a gutter layer, improving the flow pattern of gas through the permselective layer, as will be explained in detail below. Thirdly, it may not be necessary to use immiscible solvents when forming the interfacially polymerized layer, because the first reagent is contained in the sealing layer.

Another feature of the membranes of the present invention is their exceptional performance in separating hydrogen from other gases. For example, using the present teachings, it is possible to consistently make composite membranes with hydrogen/carbon dioxide selectivities in the range 10–16. In a literature screening of 120 polymers, the inventors found only two polymers reported to have a hydrogen/carbon dioxide selectivity greater than 10. These two polymers are polyvinyl chloride and polytrifluorochloroethylene, both materials with extremely low intrinsic gas permeabilities.

It is an object of the invention to provide composite separation membranes with very thin, defect-free permselective layers.

It is an object of the invention to provide interfacial composite gas separation membranes.

It is an object of the invention to provide a process for interfacial polymerization on a microporous support membrane without penetration of reagent solutions into the pores of the support membrane.

It is an object of the invention to provide composite membranes useful in separating hydrogen from gas mixtures.

Additional objects and advantages will be apparent from the description of the invention to those skilled in the art.

DETAILED DESCRIPTION OF THE INVENTION

The term permselective as used herein refers to polymers, or membranes made from those polymers, that exhibit selective permeation for at least one gas in a mixture over another gas in that mixture, enabling a measure of separation between those gases to be achieved.

The term composite membrane as used herein means comprising a support membrane and one or more additional membrane layers.

The term interfacial composite membrane as used herein means a composite membrane having a permselective layer prepared by interfacial polymerization directly on the underlying layers.

The term multilayer interfacial composite membrane as used herein means a membrane comprising a substrate layer, a sealing layer and an interfacially polymerized permselective layer.

The term gas as used herein means a gas or a vapor.

The term selectivity as used herein means the ratio of the permeabilities of two gases or vapors as determined with pure gas or vapor samples.

The present invention is concerned with the preparation of interfacial composite membranes for gas separation, pervaporation or other applications. The chemistry of the interfacial polymerization reaction is similar to that used to produce existing interfacial composite, reverse-osmosis membranes. The membranes differ from those currently made and used for reverse osmosis in several aspects, particularly in having a sealing layer between the support layer and the permselective interfacially polymerized layer.

The membrane of the invention comprises three layers: 1) a substrate layer, 2) a sealing layer, and 3) an interfacially polymerized layer. The substrate layer is preferably an asymmetric microporous layer, and the sealing layer is preferably made from a high-flux, rubbery polymer. Together, the substrate layer and the sealing layer are called the composite support membrane.

Preparation of Composite Support Membrane

The composite support membrane is prepared in two steps. The first step involves casting a microporous substrate and the second step involves coating the substrate with the sealing layer. The microporous substrate should have a flow resistance that is very small compared to the permselective layer. A preferred support membrane is an asymmetric Loeb-Sourirajan type membrane, which consists of a relatively open, porous substrate with a thin, dense, finely porous skin layer. Preferably the pores in the skin layer should be less than 1 micron in diameter, to facilitate defect-free coating. The support membrane should resist the solvents used in applying the sealing layer. Polymers that may be used to form the microporous support membrane include polysulfone, polyimide, polyvinylidene fluoride, polyamide, polypropylene or polytetrafluoroethylene. The membranes may be prepared by the processes for making finely microporous or asymmetric membranes known in the art. References that teach the preparation of such membranes include an article by H. Strathmann et al. entitled "The formation mechanism of asymmetric membranes", in Desalination, Vol. 16, 175 (1975). Commercial ultrafiltration membranes, for example, NTU ® 4200 (crosslinked polyimide), or NTU ® 3050 (polysulfone) from Nitto Electric Industrial Company, Osaka, Japan, are also suitable as supports. Microporous membranes made by extruding a polymer film, then stretching it to form pores or voids, may also be used. Such membranes are conventional in the art, and are available commercially, for example as Celgard ® (Celanese Separations, Charlotte, N.C.), Gore-Tex ® (W. L. Gore & Associates, Inc., Elkton, Md.) or Accurel ® (Akzo Technical Membranes, Asheville, N.C.). Optionally, the support membrane may be reinforced by casting it on a fabric or paper web. The web increases the strength of the substrate layer and facilitates handling during manufacture. The web material may be made from woven or non-woven polyester or the like. In a typical operation, the microporous substrate may be prepared as follows. The casting solution, consisting of a polymer solution dissolved in a water-miscible solvent, is doctored onto the moving web. The web passes into a water bath which precipitates the polymer to form the microporous membrane. The web is then collected on a take-up roll, after which the membrane is washed overnight to remove any remaining solvent and dried to form the microporous membrane.

The sealing layer should be non-porous, and should permit a high gas flux compared with the permselective layer, so that its presence does not adversely affect membrane performance. A number of rubbery polymers have high gas permeabilities and these are preferred for use as the intermediate sealing layer. Thermoplastic elastomers and copolymers that combine hard and soft domains in the copolymer structure are also useful. Polymers that may be used include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, polybutadiene, polyisoprene, poly(butene-1), polystyrene-butadiene copolymers, styrene/butadiene/styrene block copolymers, styrene/ethylene/butylene block copolymers, thermoplastic polyolefin elastomers, and block copolymers of polyethers and polyesters. The sealing layer should be sufficiently thin to permit a flux of the permeating components that is high compared with the permselective layer, yet it should also be relatively free of pinholes or other defects. A particularly preferred material for the sealing layer is silicone rubber. Silicone rubber solutions can wet a finely microporous support and leave a uniform, defect-free coating after solvent evaporation. The preferred method of depositing the sealing layer is by dip coating. The dip coating method is described, for example, in U.S. Pat. No. 4,243,701 to Riley et al., incorporated herein by reference. For example, a support membrane from a feed roll is passed through a coating station, then to a drying oven, and is then wound onto a product roll. The coating station may be a tank containing a dilute polymer or prepolymer solution, in which a coating typically 50 to 100 microns thick is deposited on the support. Assuming a 1% concentration of polymer in the solution, after evaporation a film 0.5 to 1 micron thick is left on the support.

Alternatively, the sealing layer may be cast by spreading a thin film of the polymer solution on the surface of a water bath. After evaporation of the solvent, the layer may be picked up onto the microporous support. This method is more difficult in practice, but may be useful if the desired support is attacked by the solvent used to dissolve the sealing material. The thickness of the sealing layer is not critical to the invention, but should be such that the resistance of the sealing layer to gas passage is much less than the resistance of the permselective layer. Generally a thickness less than about 20 microns is preferred.

It is also possible to use non-rubbery materials as the sealing layer for some applications. As just one representative example, it is known in the art that membranes suitable for gas separation applications can be made by applying a thin, permselective coating of ethylcellulose onto a microporous support membrane. Such a membrane is described, for instance, in U.S. Pat. No. 4,871,378. Ultrathin ethylcellulose films exhibit relatively high fluxes of certain gases, such as hydrogen or nitrogen. Therefore it would be possible to make very selective, useful flux hydrogen-selective membranes, for example, with an ethylcellulose sealing layer.

The sealing layer has at least two important and advantageous functions with respect to the interfacially polymerized layer. It plugs the pores in the microporous support membrane and prevents penetration of the reagent solutions used to form the permselective layer. Consequently, retention in the support membrane pores of an unreacted or partially reacted gel layer, which may dry to a rigid gas permeation barrier, is completely eliminated. The sealing layer is also a vehicle for holding the first reagent and providing contact with the second reagent. This is a new concept in interfacial polymerization reactions. The inventors believe that, because the first reagent is carried by the sealing layer, the reaction zone is defined by the interface of the sealing layer and the second reagent solution. As a result, a well defined, continuous film can be formed, without the limitation that the solvents used to carry the two reagents be completely immiscible. The inventors believe that the ability to use miscible or mutually soluble solvents will be found to significantly expand the repertoire of interfacial polymerization chemistries suitable for membrane making. Previously it has almost invariably been the case that interfacial composite membranes have been prepared using an organic solvent for one reagent and water for the other. Many polymer-forming chemicals do not dissolve in water, and the drying of water-containing membranes may destroy their gas permeation properties, as described above. As a specific example of the use of miscible solvents, suppose that silicone rubber were used as the sealing layer material. Silicone rubber is poorly wetted by water, but is wetted and swells in organic solvents such as hexane or acetone. Acetone and hexane are miscible, and could not have been previously used together as solvents for film-forming interfacial polymerization reactions. However, a first reagent could be dissolved in acetone and sorbed into the surface of the silicone rubber layer. The membrane could then be contacted with the second reagent in a hexane solution, and the polymerization reaction would proceed in the surface regions of the sealing layer. The swelling of the sealing layer caused by the acetone would promote penetration and good adhesion between the interfacially polymerized layer and the sealing layer.

The sealing layer also has an important and advantageous function with respect to the complete interfacial composite membrane. The sealing layer serves as a gutter layer. The function of a gutter layer can be understood by first describing gas flow through a composite membrane that does not have a gutter layer. Such a membrane comprises an extremely thin, dense, permselective layer, through which gas travels by solution/diffusion, supported on a microporous support, through which gas flows in the pores. Gas flowing through the permselective layer perpendicular to the layer surface would take the shortest, quickest path to reach the support layer. However this will only be possible in the minority of regions of the permselective layer, where there is a directly underlying pore in the microporous support. The bulk of gas molecules will be forced to take a longer, oblique path in their "search" for a pore. The result is that the effective thickness of the permselective layer, as encountered by the bulk of the permeating gas, may be several times thicker than the actual thickness. The thinner the permselective layer can be made, the more significant this factor becomes. Interfacial polymerization is a technique for making membranes of extreme thinness, when compared for example with dip-coating or other composite membrane making methods. To take full advantage of the thinness, a gutter layer is highly desirable. If a high-flux, non-porous gutter layer is used, gas flow through the permselective layer into the gutter layer occurs perpendicularly. The gutter layer has very high permeability compared with the permselective layer, so gas molecules pass comparatively freely through the gutter layer to reach the pores in the microporous substrate.

Formation of Interfacial Polymerized Layers

The permselective layer is formed on the coated surface of the composite support membrane by interfacial polymerization. Interfacial polymerization is a process in which two immiscible solutions, each containing a monomer or prepolymer, are brought into contact. At the interface of the two solutions, the monomers react to form a thin polymer layer. The reaction tends to be self-controlling, because the polymer layer that forms creates a barrier through which the reagents must pass by diffusion if the reaction is to continue. Depending on the nature of the reagents, it is possible to make many different kinds of polymers by interfacial reactions, for example polyamides, polyesters, polyureas, polycarbonates and polyurethanes. The properties of the polymer produced will depend on many factors, including the choice of reagents, the activity of the reagents, their concentration in the solution, the nature of the solvents, the speed of the reaction and the reaction temperature. A full treatment of the subject is given in "Condensation Polymers: By Interfacial and Solution Methods", by P. W. Morgan, Volume 10 of "Polymer Reviews", published by Interscience Publishers, New York, N.Y., (1965). This reference describes the recipes for making many different interfacial polymers, and the conditions under which they are produced.

Interfacial polymerization reactions useful for making membranes as envisaged by the present invention should have certain attributes, including:

a) The reaction should be capable of forming a thin film.

b) The polymer produced as a result of the reaction should be insoluble in the solvents used to carry the reagents.

c) The reagents may, but need not, be soluble in mutually insoluble or immiscible solvents.

d) The reactant solution that is first applied to the composite support membrane should completely wet the support membrane to form a continuous layer.

e) The reaction should preferably be one that proceeds rapidly at moderate temperatures.

f) The reaction should proceed rapidly to completion to form a dense, unbroken film.

g) The reaction should preferably proceed without side reactions that produce unwanted by-products that could affect the membrane properties.

h) The resulting polymer should preferably exhibit a degree of crosslinking.

Suitable combinations of reagents and solvents for making interfacially polymerized membranes are listed extensively in U.S. Pat. Nos. 3,996,318 and 3,744,642, both of which are incorporated herein by reference in their entirety. In particular, U.S. Pat. No. 3,996,318, in the table in column 5, lists compatible reagents and the type of reaction product obtained. The table in column 9 lists organic solvents that may be used to dissolve the second reagent when water is used to dissolve the first. The list running from column 10, line 45 to column 13, line 12 gives representative reactants for making crosslinked polymers within the general categories of the table in column 9.

Most preferably, a rigid, crosslinked interfacially polymerized layer is desired for gas separation applications. The solvents used to dissolve the reagents may both be organic, or one may be organic and one may be aqueous, for example. Representative solvents that may be used include water, alcohols, such as ethanol, methanol and so on, ethyl acetate, acetone, hexane, benzene, carbon tetrachloride, pentane, chloroform, methylene chloride, trichloroethane and trichloroethylene. If miscible solvents are to be used, there are many possible combinations. Acetone and hexane is one possible combination. If mutually immiscible solvents are to be used, a preferred solvent for the aqueous phase is water. The most preferred water-soluble reagents are amines, in particular diamines, and more particularly aliphatic diamines. An especially preferred diamine is 1,6-hexane diamine. A preferred organic solvent is hexane. The most preferred organic-soluble reagents for reacting with amines are those containing three functional groups, for example, trifunctional acyl halides. 1,3,5-benzene tricarbonyl trichloride is a representative preferred organic-soluble reagent.

A typical process for forming the interfacially polymerized layer is as follows. The composite support membrane is submerged in an organic solvent solution, such as hexane, containing a reagent with multiple functional groups, such as an acyl chloride or a diisocyanate. After immersion, the composite support membrane is removed from the organic solvent bath and held vertically to drain excess solution. The composite support membrane is then submerged in an aqueous solution of a second reagent with multiple functional groups, such as a diamine or polyamine solution. The amine and the acyl chloride or diisocyanate react to form a highly crosslinked polymer. The reaction takes place only at the interface between the aqueous phase and the hexane phase. Thus, a polymerized layer is formed on top of the sealing layer. After a period of time, the membrane is removed from the aqueous bath. The interfacial composite membrane is subsequently air-dried at room temperature.

The process can also be carried out by immersing the composite support membrane first in an aqueous solution, then contacting it with an organic solution, or by using two organic solvents, immersing the support first in one, then exposing it to the other.

The solvent used to dissolve the first reactant should not dissolve the material of the sealing layer. However, some swelling of the sealing material in the organic solvent is desirable, because this will enable the reagent to penetrate into the sealing layer to some extent. This will both hold a certain thickness of the reagent for the polymerization step and achieve good adhesion between the sealing layer and the selective layer. The amount of the first reagent picked up by the sealing layer and the depth of penetration of the reagent into the sealing layer will depend on the length of time for which the support membrane is in contact with the first reagent solution. It is believed that, when the polymerization reaction has proceeded to the point where a continuous crosslinked barrier layer is formed, further reaction is rate-limited by diffusion of the aqueous-bound reagent into the organic phase through the interfacially polymerized layer. Consequently, it appears that the rate of polymerization decreases dramatically when a continuous polymer layer has formed.

The immersion or contact time of the composite support membrane in or with the first reagent solution and the contact time between the two reagent phases both have an effect on the character of the interfacially polymerized layer. The immersion or contact time of the composite support membrane with the first phase should be sufficiently long to allow a degree of penetration of that phase into the sealing layer of the composite support. Preferably the immersion time should be in the range a minute or less to 1 hour, more preferably less than about 40 minutes. As stated above, the polymerization reaction appears to take place immediately upon contact of the two solutions, and to essentially terminate as soon as a continuous layer is formed. Therefore, a relatively short contact time is adequate for this step, typically less than 10 minutes, and often as little as one minute or less.

In an industrial process, it is likely that both the first and second contact steps will be carried out in continuous mode by machine. The contact times can be reduced by heating the solutions, if necessary. When performed on continuous machinery, it is anticipated that both first contact and second contact steps could be carried out adequately in a few minutes or even a few seconds.

The preparation process described above involves four discrete steps: making or providing the microporous substrate, coating it with the sealing layer, exposing the composite support to the first reagent solution, and contacting the wetted support with the second reagent solution. Alternatively, it is believed that it will also be found possible to produce the membranes of the invention by a three-step process. In this process, the coating solution used to make the sealing layer also contains the first reagent. Once the sealing layer has been formed, all that would be necessary would be to contact the sealing layer with a solution containing the second reagent. The amount of the first reagent available for reaction would be controlled by its concentration in the coating solution. The interfacially polymerized layer would still only form at the interface of the sealing layer and the second reagent solution. This preparation technique might be advantageous in large-scale industrial production.

Interfacially polymerized composite membranes may be made in any of the standard types of membranes known in the art, such as flat sheets or hollow fibers. Once formed, the membranes may be configured into modules as is known in the art, such as plate-and frame, potted bundles of fibers, or spiral-wound. Spiral-wound modules are a preferred choice. References that teach the preparation of spiral-wound modules are S. S. Kreman, "Technology and Engineering of ROGA Spiral Wound Reverse Osmosis Membrane Modules", in Reverse Osmosis and Synthetic Membranes, S. Sourirajan (Ed.), National Research Council of Canada, Ottawa, 1977; and U.S. Pat. No. 4,553,983, column 10, lines 40–60.

It is believed that the composite supports and permselective layer preparation techniques described herein will be useful throughout the gas separation field. The permselective layer has a glassy, crosslinked structure, and therefore will typically be more permeable to small gas molecules with relatively large diffusion coefficients. It is believed that the membranes disclosed herein are particular valuable, for example, in separating hydrogen or helium from other gases, such as carbon dioxide, oxygen, nitrogen, ammonia, methane, and other hydrocarbon or organic gases and vapors. As a specific instance of an application for the membranes of the invention, the separation of hydrogen from carbon dioxide has to be performed in a number of industrial processes, such as ammonia synthesis, hydrocracking, steam reforming and the production of synthetic gas. Conventional gas separation membranes are not useful in these processes because of their limited selectivity.

It is also believed that the membranes of the invention will be useful in pervaporation. Pervaporation is a membrane process in which a liquid containing two or more components is passed across a permselective membrane. A vapor enriched in one component is withdrawn from the permeate side of the membrane. The separation that is obtained depends both on the difference in volatilities of the liquid components and the difference in their diffusion properties through the membrane. Pervaporation can be used, for example, to separate volatile organic components from water, to remove water from organic solutions, such as alcohol, or to separate organic liquids from each other. The membranes of the invention should be particularly useful in dewsatering applications.

The invention is now further illustrated by the following examples, which are intended to be illustrative of the invention, but are not intended to limit the scope or underlying principles of the invention in any way.

EXAMPLES

Examples 1–10

A set of experiments was performed to prepare interfacially polymerized permselective membranes from a selection of reagents. The composite support membrane was the same in each case. Interfacially polymerized layers were formed on the support using the sets of reagents shown in Table 1.

TABLE 1

Reagents used to make Interfacially Polymerized Membranes

| Water-soluble reagent | Organic-soluble reagent |
|---|---|
| 1. Polyethyleneimine (PEI) | 1. Toluene-2,4-diisocyanate (TDI) |
| 2. (PEI) | 2. 1,3,5-Benzene tricarbonyl trichloride (BTC) |
| 3. Piperazine | |
| 4. 1,3-Propane diamine | |
| 5. 1,6-Hexane diamine | |
| 6. 1,9-Nonane diamine | |
| 7. 1,3-Phenylene diamine | |
| 8. 1,4-Phenylene diamine | |

Example 1. Preparation of composite support membrane.

Composite support membranes were prepared by first casting a microporous membrane on a polyester web, then coating the microporous membrane with a thin sealing layer. The casting solution, consisting of 17.5 wt % UDEL ® P3500 (Amoco Co, Marietta, OH) in 82.5 wt % dimethylformamide, was doctored onto a moving non-woven, polyester web. The casting speed was 3.5 m/min and the knife gap was 178 μm. The belt passed into a water bath, which precipitated the polymer to form the microporous membrane. The belt was then collected on a take-up roll, the membrane was washed overnight to remove any remaining solvent and dried to form the microporous membrane. The dip-coating operation was then performed as follows. The polysulfone membrane was fed from a feed roll through a coating station containing 1.8 wt % polydimethylsiloxane (Wacker Silicones Co., Adrian, MI), in 98.2 wt % 2,2,4-trimethylpentene. The coated membrane passed through a drying oven, and was wound up on a product roll. This operation coated the traveling microporous membrane with a liquid layer, 50 to 100 μm thick. After evaporation of the solvent, a polymer film, 0.5 to 2 μm thick, was left on the membrane. Similar coating operations were carried out using polymethylpentene, TPX ® MX 002 (Mitsui Co., New York, NY) and a polyamide copolymer, Pebax ® 4011 (Atochem Inc, Glen Rock, NJ) as the sealing layer.

The finished thickness of the sealing layer of the composite support membranes was obtained by comparing its nitrogen flux with values obtained from isotropic films of known thickness. The sealing layer was checked for integrity by measuring the ratio of the oxygen and nitrogen permeabilities. Only those supports where the measured selectivity was close to the intrinsic selectivity of the coating polymer were used in the interfacial polymerization experiments.

The composite support membranes that passed the integrity test were tested for hydrogen and carbon dioxide permeability using a permeation test cell. The permeate gas flow rate was measured with bubble flowmeters, then converted into a normalized permeation rate at a standard pressure difference (1 cmHg) and a standard membrane area (1 cm$^2$). The pressure on the feed side of the cell was 200 psig. The permeate side was at atmospheric pressure. The test cell had a membrane area of 36.8 cm$^2$. The results are summarized in Table 2.

TABLE 2

Normalized Permeation Rates and Hydrogen/Carbon Dioxide of Composite Support Membranes with Various Sealing Layers

| Composite Support Membrane | Normalized Permeation Rate $(cm^3(STP)/cm^2 \cdot s \cdot cmHg)$ | | Selectivity $H_2/CO_2$ |
|---|---|---|---|
| | $H_2$ | $CO_2$ | |
| Polysulfone (PSF) alone | $9.0 \times 10^{-2}$ | $3.3 \times 10^{-2}$ | 2.7 |
| PSF/silicone rubber | $6.1 \times 10^{-4}$ | $2.3 \times 10^{-3}$ | 0.26 |
| PSF/polymethylpentene | $5.6 \times 10^{-5}$ | $5.0 \times 10^{-5}$ | 1.1 |
| PSF/polyamide copolymer | $1.7 \times 10^{-5}$ | $4.5 \times 10^{-5}$ | 0.38 |

Example 2

An interfacially polymerized permselective layer was formed on the composite support membrane of Example 1 that had a silicone rubber sealing layer. The preparation technique was as follows. The interfacially polymerized layer was made by submerging the composite support membrane in a hexane solution containing 0.5 wt % toluene-2,4-diisocyanate.

After thirty minutes, the composite support membrane was removed from the hexane bath and held vertically for one minute to drain excess solution. The composite support membrane was then submerged in an aqueous polyethyleneimine (PEI) solution, containing 1.0 wt % PEI (MW 70,000) in 99.0 wt % distilled water. After five minutes, the membrane was removed from the aqueous bath and air-dried at room temperature.

The resulting membrane was tested in a permeation cell using the same procedure as was used to evaluate the composite support membranes described in Example 1. The results are summarized in Table 3.

Example 3

The procedure of Example 2 was repeated using a hexane solution containing 1.0 wt % 1,3,5-benzene tricarbonyl trichloride and an aqueous PEI solution containing 1.0 wt % PEI (MW 10,000) and 1.0 wt % potassium hydroxide in 98 wt % distilled water.

The resulting membrane was tested in a permeation cell using the same procedure as was used to evaluate the composite support membranes described in Example 1. The results are summarized in Table 3.

Example 4

The procedure of Example 2 was repeated using a hexane solution containing 1.0 wt % 1,3,5-benzene tricarbonyl trichloride and an aqueous piperazine solution containing 1.0 wt % piperazine and 1.0 wt % potassium hydroxide in 98.0 wt % distilled water.

The resulting membrane was tested in a permeation cell using the same procedure as was used to evaluate the composite support membranes described in Example 1. The results are summarized in Table 3.

Example 5

The procedure of Example 2 was repeated using a hexane solution containing 1.0 wt % 1,3,5-benzene tricarbonyl trichloride and an aqueous 1,3-propane diamine solution containing 1.0 wt % dimamine and 1.0 wt % potassium hydroxide in 98 wt % distilled water.

The resulting membrane was tested in a permeation cell using the same procedure as was used to evaluate the composite support membranes described in Example 1. The results are summarized in Table 3.

Example 6

The procedure of Example 2 was repeated using a hexane solution containing 1.0 wt % 1,3,5-benzene tricarbonyl trichloride and an aqueous 1,6-hexane diamine solution containing 1.0 wt % diamine and 1.0 wt % potassium hydroxide in 98 wt % distilled water.

The resulting membrane was tested in a permeation cell using the same procedure as was used to evaluate the composite support membranes described in Example 1. The results are summarized in Table 3.

Example 7

The procedure of Example 2 was repeated using a hexane solution containing 1.0 wt % 1,3,5-benzene tricarbonyl trichloride and an aqueous 1,9-nonane diamine solution containing 1.0 wt % diamine and 1.0 wt % potassium hydroxide in 98 wt % distilled water.

The resulting membrane was tested in a permeation cell using the same procedure as was used to evaluate the composite support membranes described in Example 1. The results are summarized in Table 3.

Example 8

The procedure of Example 2 was repeated using a hexane solution containing 1.0 wt % 1,3,5-benzene tricarbonyl trichloride and an aqueous 1,3-phenylene diamine solution containing 1.0 wt % diamine and 1.0 wt % potassium hydroxide in 98 wt % distilled water.

The resulting membrane was tested in a permeation cell using the same procedure as was used to evaluate the composite support membranes described in Example 1. The results are summarized in Table 3.

Example 9

The procedure of Example 2 was repeated using a hexane solution containing 1.0 wt % 1,3,5-benzene tricarbonyl trichloride and an aqueous 1,4-phenylene diamine solution containing 1.0 wt % diamine and 1.0 wt % potassium hydroxide in 98 wt % distilled water.

The resulting membrane was tested in a permeation cell using the same procedure as was used to evaluate the composite support membranes described in Example 1. The results are summarized in Table 3.

TABLE 3

Normalized Permeation Rates and Hydrogen/Carbon Dioxide Selectivity for Various Interfacial Composite Membranes

| Example | Reagent | Normalized Permeation Rate $(cm^3(STP)/cm^2 \cdot s \cdot cmHg)$ | | Selectivity $H_2/CO_2$ |
|---|---|---|---|---|
| | | $H_2$ | $CO_2$ | |
| 2. | PEI/TDI | $3.6 \times 10^{-6}$ | $1.2 \times 10^{-5}$ | 0.30 |
| 3. | PEI/BTC | $1.1 \times 10^{-6}$ | $5.0 \times 10^{-6}$ | 0.22 |
| 4. | Piperazine/BTC | $2.5 \times 10^{-6}$ | $1.4 \times 10^{-6}$ | 2.1 |
| 5. | 1,3-propane-diamine/BTC | $2.9 \times 10^{-6}$ | $3.2 \times 10^{-6}$ | 0.91 |
| 6. | 1,6-hexane-diamine/BTC | $4.4 \times 10^{-6}$ | $3.2 \times 10^{-7}$ | 14 |
| 7. | 1,9-Nonane-diamine/BTC | $7.8 \times 10^{-6}$ | $1.1 \times 10^{-6}$ | 7.1 |
| 8. | 1,3-Phenylene-diamine/BTC | $2.9 \times 10^{-6}$ | $1.1 \times 10^{-6}$ | 2.6 |
| 9. | 1,4-Phenylene-diamine/BTC | $1.8 \times 10^{-5}$ | $6.7 \times 10^{-6}$ | 2.7 |

PEI: polyethyleneimine
TDI: toluene diisocyanate
BTC: 1,3,5-benzene tricarbonyl trichloride Examples 2 and 3 were prepared from a polyamine and a diisocyanate, and a polyamine and a trifunctional agent, respectively. As can be seen, the membranes prepared using polyamines, preferred for the preparation of reverse osmosis membranes, did not form adequate gas separation membranes. The selectivities obtained are essentially those of the silicone rubber sealing layer.

Examples 10-15

A series of membranes was prepared using the same reagents and general procedure as in Example 6. The same time of contact between the composite support membrane and hexane phase, and between the hexane loaded support and the aqueous phase was used in each case.

Example 10

An interfacially polymerized membrane was prepared as follows. A composite support membrane was a silicone rubber sealing layer was prepared and tested for integrity as in Example 1. The interfacially polymerized layer was made by submerging the composite support membrane in a hexane solution containing 1 wt % 1,3,5-benzene tricarbonyl trichloride.

After one minute, the composite support membrane was removed from the hexane bath and held vertically for one minute to drain excess solution. The composite support membrane was then submerged in an aqueous 1,6-hexane diamine solution containing 1.0 wt % diamine and 1.0 wt % potassium hydroxide in 98 wt % distilled water. After one minute, the membrane was removed from the aqueous bath and air-dried at room temperature.

The resulting membrane was tested in a permeation cell using the same procedure as was used to evaluate the composite support membranes described in Example 1. The results are summarized in Table 4.

Example 11

The procedure as in Example 10 was repeated, using immersion and contact times of five minutes.

The resulting membrane was tested in a permeation cell using the same procedure as was used to evaluate the composite support membranes described in Example 1. The results are summarized in Table 4.

Example 12

The procedure as in Example 10 was repeated, using immersion and contact times of 10 minutes.

The resulting membrane was tested in a permeation cell using the same procedure as was used to evaluate the composite support membranes described in Example 1. The results are summarized in Table 4.

Example 13

The procedure as in Example 10 was repeated, using immersion and contact times of 15 minutes.

The resulting membrane was tested in a permeation cell using the same procedure as was used to evaluate the composite support membranes described in Example 1. The results are summarized in Table 4.

Example 14

The procedure as in Example 10 was repeated, using immersion and contact times of 30 minutes.

The resulting membrane was tested in a permeation cell using the same procedure as was used to evaluate the composite support membranes described in Example 1. The results are summarized in Table 4.

Example 15

The procedure as in Example 10 was repeated, using immersion and contact times of 60 minutes.

The resulting membrane was tested in a permeation cell using the same procedure as was used to evaluate the composite support membranes described in Example 1. The results are summarized in Table 4.

TABLE 4

Normalized Permeation Rate and Selectivity Data for 1,3,5-Benzenetricarbonyl Trichloride/1,6-Hexanediamine Interfacial Composite Membranes Using Various Solution Contact Times.

| Example | Solution Contact Time* (min) | Normalized Permeation Rate ($cm^3$(STP)/$cm^2 \cdot s \cdot cmHg$) | | | Selectivity $H_2/CO_2$ |
|---|---|---|---|---|---|
| | | $N_2$ | $H_2$ | $CO_2$ | |
| 10. | 1 | $3.6 \times 10^{-7}$ | $1.7 \times 10^{-6}$ | $9.1 \times 10^{-7}$ | 1.9 |
| 11. | 5 | ** | $4.2 \times 10^{-6}$ | ** | — |
| 12. | 10 | $3.0 \times 10^{-7}$ | $2.6 \times 10^{-6}$ | $2.7 \times 10^{-7}$ | 9.6 |
| 13. | 15 | ** | $5.1 \times 10^{-6}$ | $3.1 \times 10^{-7}$ | 16 |
| 14. | 30 | ** | $6.0 \times 10^{-6}$ | $4.5 \times 10^{-7}$ | 13 |
| 15. | 60 | $2.9 \times 10^{-7}$ | $2.8 \times 10^{-6}$ | $1.9 \times 10^{-7}$ | 14 |

*Time of contact between composite support membrane and hexane phase and between hexane phase and aqueous phase.
**Permeation rate too slow to measure.

Examples 16-19

A series of membranes was prepared using the same reagents and general procedure as in Example 10-15. In this case, the same immersion time was used for all the experiments, but the contact time between the reagents was varied.

Example 16

An interfacially polymerized membrane was prepared as follows. A composite support membrane with a silicone rubber sealing layer was prepared and tested for integrity as in Example 1. The interfacially polymerized layer was made by submerging the composite support membrane in a hexane solution containing 1.0 wt % 1,3,5-benzene tricarbonyl trichloride.

After 30 minutes, the composite support membrane was removed from the hexane bath and held vertically for one minute to drain excess solution. The composite support membrane was then submerged in an aqueous 1,6-hexane diamine solution containing 1.0 wt % diamine and 1.0 wt % potassium hydroxide in 98 wt % distilled water. After one minute, the membrane was removed from the aqueous bath and air-dried at room temperature.

The resulting membrane was tested in a permeation cell using the same procedure as was used to evaluate the composite support membranes described in Example 1. The results are summarized in Table 5.

Example 17

The procedure as in Example 16 was repeated, using an immersion time of 30 minutes and a contact time between the reagents of 5 minutes.

The resulting membrane was tested in a permeation cell using the same procedure as was used to evaluate the composite support membranes described in Example 1. The results are summarized in Table 5.

Example 18

The procedure as in Example 16 was repeated, using an immersion time of 30 minutes and a contact time between the reagents of 10 minutes.

The resulting membrane was tested in a permeation cell using the same procedure as was used to evaluate the composite support membranes described in Example 1. The results are summarized in Table 5.

Example 19

The procedure as in Example 16 was repeated, using an immersion time of 30 minutes and a contact time between the reagents of 30 minutes.

The resulting membrane was tested in a permeation cell using the same procedure as was used to evaluate the composite support membranes described in Example 1. The results are summarized in Table 5.

TABLE 5

Normalized Permeation Rates and Hydrogen/Carbon Dioxide Selectivities of 1,3,5-Benzenetricarbonyl Trichloride/1,6-Hexanediamine Interfacial Composite Membranes Prepared by Varying the Reagent Contact Time.

| Example Number and Contact Time (min) | Normalized Permeation Rate $(cm^3(STP)/cm^2 \cdot s \cdot cmHg)$ | | | Selectivity $H_2/CO_2$ |
|---|---|---|---|---|
| | $N_2$ | $H_2$ | $CO_2$ | |
| 16. 1 | — | $5.6 \times 10^{-6}$ | $4.0 \times 10^{-7}$ | 14 |
| 17. 5 | $9.2 \times 10^{-8}$ | $4.4 \times 10^{-6}$ | $3.2 \times 10^{-7}$ | 14 |
| 18. 10 | $1.7 \times 10^{-7}$ | $6.4 \times 10^{-6}$ | $5.9 \times 10^{-7}$ | 11 |
| 19. 30 | $1.1 \times 10^{-7}$ | $4.6 \times 10^{-6}$ | $5.4 \times 10^{-7}$ | 8.5 |

The data in Table 5 show that a contact time of only one minute was sufficient in this case for the interfacial polymerization reaction to occur.

Comparing the sets of examples 10-15 and 16-19, it appears that the increase in hydrogen/carbon dioxide selectivity with increasing contact times shown in Table 4 is the result of increased penetration of the BTC into the silicone rubber sealing layer.

The data in Table 5 show that the permeation rates of the membrane do not decrease with increasing contact time between the hexane-soaked composite support membrane and the aqueous 1,6-hexane diamine solution. This suggests that after the initial interfacial polymerized layer is formed, the reaction essentially ceases due to slow amine diffusion through the interfacial layer.

Examples 20-27

Interfacially polymerized composite membranes were prepared as in Example 17. The membranes were tested using the procedure described in Example 1 with the following pure gases: helium, hydrogen, oxygen, nitrogen, methane, carbon dioxide, ethane, propane, and butane. The results are summarized in Table 6.

TABLE 6

Normalized Permeation Rates and Selectivities for a BTC/1,6-Hexanediamine Interfacial Composite Membrane

| Example | Gas | Normalized Flux $cm^3(STP)/cm^2 \cdot s \cdot cmHg$ | Selectivity Hydrogen/gas |
|---|---|---|---|
| 20 | He | $2.9 \times 10^{-6}$ | 0.83 |
| 21 | $H_2$ | $2.5 \times 10^{-6}$ | 1.0 |
| 22 | $O_2$ | $6.7 \times 10^{-8}$ | 37 |
| 23 | $N_2$ | $2.0 \times 10^{-8}$ | 125 |
| 24 | $CH_4$ | $4.3 \times 10^{-8}$ | 58.8 |
| 25 | $CO_2$ | $1.8 \times 10^{-7}$ | 13.8 |
| 26 | $C_2H_6$ | $8.3 \times 10^{-8}$ | 30.3 |
| 27 | $C_3H_8$ | $2.2 \times 10^{-7}$ | 11.3 |

The performance of the interfacial composite membrane is typical of the behavior of glassy polymers, in that small molecules permeate preferentially compared with larger molecules. The hydrogen/carbon dioxide selectivity of the interfacial composite membrane is exceptionally high.

Examples 28-31

A series of experiments was carried out using the same general preparation technique and immersion and contact times as in Example 17, but with various types of polymers for the composite support membrane sealing layer.

Example 28

An asymmetric microporous support membrane was cast using the same recipe and procedure as in Example 1. The membrane was not coated with a sealing layer. An interfacially polymerized layer was formed on the uncoated support as follows. The support membrane was submerged in a hexane solution containing 1.0 wt % 1,3,5-benzene tricarbonyl trichloride.

After 30 minutes, the composite support membrane was removed from the hexane bath and held vertically for one minute to drain excess solution. The composite support membrane was then submerged in an aqueous 1,6-hexane diamine solution containing 1.0 wt % diamine and 1.0 wt % potassum hydroxide in 98 wt % distilled water. After five minutes, the membrane was removed from the aqueous bath and air-dried at room temperature.

The resulting membrane was tested in a permeation cell using the same procedure as was used to evaluate the composite support membranes described in Example 1. The results are summarized in Table 7.

Example 29

An asymmetric microporous support membrane was cast using the same recipe and procedure as in Example 1, with a silicone rubber sealing layer. An interfacially polymerized layer was formed on the composite support membrane using the same procedure as in Example 28.

The resulting membrane was tested in a permeation cell using the same procedure as was used to evaluate the composite support membranes described in Example 1. The results are summarized in Table 7.

Example 30

An asymmetric microporous support membrane was cast using the same recipe and procedure as in Example 1, with a polymethylpentene sealing layer prepared from a 2.0 wt % solution of polymethylpentene (TPX ® MX 002, Mitsui Co, New York, N.Y.) in 98 wt % cyclohexane. An interfacially polymerized layer was formed on the composite support membrane using the same procedure as in Example 28.

The resulting membrane was tested in a permeation cell using the same procedure as was used to evaluate the composite support membranes described in Example 1. The results are summarized in Table 7.

Example 31

An asymmetric microporous support membrane was cast using the same recipe and procedure as in Example 1, with a sealing layer prepared from a 1.0 wt % polyamide copolymer (Pebax ® 4011, Atochem, Inc., Glen Rock, N.J.) in 99.0 wt % butanol solution. An interfacially polymerized layer was formed on the composite support membrane using the same procedure as in Example 28.

The resulting membrane was tested in a permeation cell using the same procedure as was used to evaluate the composite support membranes described in Example 1. The results are summarized in Table 7.

TABLE 7

Normalized Permeation Rates and Selectivities of 1,3,5-Benzenetricarbonyl Trichloride 1,6-Hexanediamine Interfacial Polymerized Layers Formed on Different Composite Support Membranes.

| Example | Composite Support Membrane | Normalized Permeation Rate (cm$^3$(STP)/ cm$^2 \cdot$ s $\cdot$ cmHg) | | Selectivity H$_2$/CO$_2$ |
|---|---|---|---|---|
| | | H$_2$ | CO$_2$ | |
| 28. | Polysulfone (PSF)alone | $2.2 \times 10^{-5}$ | $4.5 \times 10^{-6}$ | 4.9 |
| 29. | PSF/silicone rubber | $5.1 \times 10^{-6}$ | $3.1 \times 10^{-7}$ | 16 |
| 30. | PSF/polymethylpentene | $1.8 \times 10^{-6}$ | $1.5 \times 10^{-7}$ | 12 |
| 31. | PSF/polyamide copolymer | $4.8 \times 10^{-6}$ | $3.2 \times 10^{-6}$ | 1.5 |

Comparison of the results from examples 28-31 shows that an interfacially polymerized membrane prepared on a support without a sealing layer did not yield a gas separation membrane with good properties. The polyamide copolymer sealing layer also resulted in a membrane with poor hydrogen/carbon dioxide selectivity. However, in this case, the polyamide copolymer alone has a selectivity for carbon dioxide over hydrogen of about 15. That the finished interfacial composite is selective for hydrogen over carbon dioxide at all shows the powerful influence of the interfacially polymerized layer.

Examples 32-33

Two experiments was carried out following the same general preparation techniques and procedures as Examples 28-31. In this case, however, the support was immersed in the aqueous solution, then contacted with the organic solution.

Example 32

An asymmetric microporous support membrane was cast using the same recipe and procedure as in Example 1. The membrane was not coated with a sealing layer.

An interfacially polymerized layer was formed on the support as follows. The support membrane was submerged in an aqueous solution of 1,6-hexane diamine containing 1.0 wt % diamine and 1.0 wt % potassium hydroxide in 98 wt % distilled water.

After 30 minutes, the composite support membrane was removed from the water bath and held vertically for one minute to drain excess solution. The composite support membrane was then submerged in a hexane solution containing 1.0 wt % 1,3,5-benzene tricarbonyl trichloride. After five minutes, the membrane was removed from the hexane bath and air-dried at room temperature.

The resulting membrane was tested in a permeation cell using the same procedure as was used to evaluate the composite support membranes described in Example 1. The results are summarized in Table 8.

Example 33

An asymmetric microporous support membrane was cast using the same recipe and procedure as in Example 1, with a polyamide copolymer sealing layer as in Example 31. An interfacially polymerized layer was formed on the composite support membrane using the same procedure as in Example 32.

The resulting membrane was tested in a permeation cell using the same procedure as was used to evaluate the composite support membranes described in Example 1. The results are summarized in Table 8.

TABLE 8

Normalized Permeation Rates and Selectivities of 1,3,5-Benzenetricarbonyl Trichloride 1,6-Hexanediamine Interfacial Polymerized Layers Formed by Immersion in Aqueous Phase followed by contact with Organic Phase

| Example | Composite Support Membrane | Normalized Permeation Rate (cm$^3$(STP)/ cm$^2 \cdot$ s $\cdot$ cmHg) | | Selectivity H$_2$/CO$_2$ |
|---|---|---|---|---|
| | | H$_2$ | CO$_2$ | |
| 32. | Polysulfone (PSF)alone | $3.4 \times 10^{-3}$ | $1.1 \times 10^{-3}$ | 3.1 |
| 33. | PSF/polyamide copolymer | $2.0 \times 10^{-5}$ | $6.2 \times 10^{-6}$ | 3.2 |

Example 34

A test was performed to determine whether the interfacially polymerized layer extends into the matrix of the sealing layer. An interfacially polymerized membrane was prepared as in Example 17, with a silicone rubber sealing layer and an interfacial layer formed by the reaction of 1,3,5-benzenetricarbonyl trichloride with 1,6-hexane diamine. The resulting membrane was soaked in water for two hours, then dried and tested. The hydrogen permeation rate increased by a factor of three, whereas the other gas permeation rates increased by more than a factor of three. The membrane was then again soaked in water for two hours. This time, before the membrane was allowed to dry, the membrane surface was rubbed in an attempt to remove the interfacial polymerized layer. Upon retesting, the membrane properties were close to those of the silicone rubber/polysulfone composite support membrane in both permeation rates and selectivities. The interfacial layer had been removed, indicating that the polymerization reaction does not proceed substantially into the silicone rubber matrix.

We claim:

1. A separation process, comprising the steps of:
    (a) providing a separation membrane having a feed side and a permeate side, said membrane comprising:
        a microporous substrate layer;
        a sealing layer coating said microporous substrate layer;
        an interfacially polymerized permselective layer formed on said sealing layer;
    (b) contacting said feed side with a feed fluid mixture comprising component A and component B;
    (c) withdrawing from said permeate side a gas mixture enriched in component A compared with said feed fluid mixture.

2. The process of claim 1, wherein said component A is hydrogen.

3. The process of claim 1, wherein said component A is hydrogen and said component B is carbon dioxide.

4. The process of claim 1, wherein said membrane has a selectivity for component A over component B of at least 10.

5. The process of claim 1, wherein said sealing layer comprises a polymer that takes no part in a reaction used to form said permselective layer.

6. The process of claim 1, wherein said permselective layer is selectively permeable to hydrogen over carbon dioxide.

7. A membrane suitable for use in gas separation or pervaporation, comprising:
   a microporous substrate layer;
   a sealing layer coating said microporous substrate layer;
   an interfacially polymerized permselective layer formed on said sealing layer.

8. The membrane of claim 7, wherein said permselective layer is produced by reacting a first reagent and a second reagent, both reagents having two or more functional groups.

9. The membrane of claim 8, wherein said first reagent has two functional groups and said second reagent has three functional groups.

10. The membrane of claim 8, wherein said first reagent is a diamine.

11. The membrane of claim 10, wherein said diamine is 1,6-hexane diamine.

12. The membrane of claim 8, wherein said second reagent is a trifunctional acyl halide.

13. The membrane of claim 12, wherein said trifunctional acyl halide is 1,3,5-benzene tricarbonyl trichloride.

14. The membrane of claim 7, having a sealing layer comprising a rubbery polymer.

15. The membrane of claim 7, having a sealing layer comprising silicone rubber.

16. The membrane of claim 7, characterized in that the membrane exhibits a selectivity for a more permeable gas over a less permeable gas of at least 10.

17. The membrane of claim 16, wherein said more permeable gas is hydrogen.

18. The membrane of claim 17, wherein said less permeable gas is carbon dioxide.

19. The membrane of claim 7, wherein said sealing layer comprises a polymer that takes no part in a reaction used to form said permselective layer.

20. The membrane of claim 7, wherein said permselective layer is selectively permeable to hydrogen over carbon dioxide.

21. A process for preparing a separation membrane, comprising: providing a microporous substrate;
   coating said substrate with a sealing layer, to form a composite support membrane;
   contacting said composite support membrane with a first solution containing a first reagent for a first contact period; and
   contacting said composite support membrane with a second solution containing a second reagent for a second contact period.

22. The process of claim 21, wherein said first solution comprises an organic solvent.

23. The process of claim 22, wherein said organic solvent comprises hexane.

24. The process of claim 21, wherein said first solution comprises water.

25. The process of claim 21, wherein said first reagent has at least two functional groups.

26. The process of claim 21, wherein said first reagent is a diamine.

27. The process of claim 21, wherein said first reagent is 1,6-hexane diamine.

28. The process of claim 21, wherein said first reagent is trifunctional acyl halide.

29. The process of claim 21, wherein said trifunctional acyl halide is 1,3,5-benzene tricarbonyl trichloride.

30. The process of claim 21, wherein said first contact time is up to 30 minutes.

31. The process of claim 21, wherein said second contact time is up to 10 minutes.

* * * * *